US012632567B2

(12) United States Patent
Kim

(10) Patent No.: US 12,632,567 B2
(45) Date of Patent: May 19, 2026

(54) MICRO CONTROLLER UNIT AND SECURITY DIAGNOSIS METHOD THEREOF

(71) Applicant: HL MANDO CORPORATION, Gyeonggi-do (KR)

(72) Inventor: Taeil Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/829,228

(22) Filed: Sep. 9, 2024

(65) Prior Publication Data

US 2025/0190580 A1      Jun. 12, 2025

(51) Int. Cl.
G06F 21/57          (2013.01)

(52) U.S. Cl.
CPC ...... G06F 21/577 (2013.01); G06F 2221/033 (2013.01)

(58) Field of Classification Search
CPC .. G06F 21/577; G06F 2221/033; G06F 21/64; G06F 21/51; G06F 21/57; G06F 21/71; H04L 9/3242
See application file for complete search history.

(56) References Cited

U.S. PATENT DOCUMENTS

| | | | | | |
|---|---|---|---|---|---|
| 10,866,861 | B1 * | 12/2020 | Palmer | .................. | G06F 3/0679 |
| 2019/0087185 | A1 * | 3/2019 | Kim | .................... | G06F 12/1491 |
| 2019/0312892 | A1 * | 10/2019 | Chung | .................. | G06F 21/554 |
| 2021/0012588 | A1 * | 1/2021 | Kwon | .................... | G07C 5/008 |
| 2021/0390024 | A1 * | 12/2021 | Durham | .................. | G06F 21/79 |
| 2025/0315330 | A1 * | 10/2025 | Li | ......................... | G06F 11/076 |

FOREIGN PATENT DOCUMENTS

| | | |
|---|---|---|
| CN | 113468008 | 10/2021 |
| KR | 10-2019-0032861 | 3/2019 |
| KR | 10-2019-0115325 | 10/2019 |
| KR | 10-2019-0119514 | 10/2019 |
| KR | 10-2118956 | 6/2020 |

OTHER PUBLICATIONS

Office Action (1st) dated Mar. 2, 2026 for Korean Patent Application No. 10-2023-0179140 and its English translation provided by Applicant's foreign counsel.

* cited by examiner

*Primary Examiner* — Harunur Rashid
(74) *Attorney, Agent, or Firm* — WOMBLE BOND DICKINSON (US) LLP

(57)          ABSTRACT

A microcontroller unit includes a memory including a memory area for software and configured to store a cyclic redundancy check value for verification; and a processor configured to divide the memory area at a predetermined block size, calculate and accumulate a cyclic redundancy check value for each memory area divided at the predetermined block size until all the memory areas divided at the predetermined block size are referenced, and verify integrity of the software by comparing a result value accumulated by calculating the cyclic redundancy check value with the stored cyclic redundancy check value for verification.

16 Claims, 4 Drawing Sheets

MICRO CONTROLLER UNIT AND SECURITY DIAGNOSIS METHOD THEREOF

CROSS-REFERENCE TO RELATED APPLICATION

This application claims the benefit of Korean Patent Application No. 10-2023-0179140, filed on Dec. 11, 2023, in the Korean Intellectual Property Office, the disclosure of which is incorporated herein by reference in its entirety.

BACKGROUND

1. Field

Embodiments of the present disclosure generally relate to a microcontroller unit and a security diagnosis method thereof.

2. Description of the Related Art

The United Nations Economic Commission for Europe (UNECE) has proposed cybersecurity-related regulations, and accordingly, related companies should meet the requirements of cybersecurity regulations for their target products.

Cybersecurity functions applied to target products may use encryption algorithms to meet the requirements of cybersecurity regulations.

Conventionally, high-specification microcontroller units (MCUs) are required to implement cybersecurity functions using encryption algorithms.

High-specification MCUs are expensive MCUs equipped with a hardware security module (HSM), and accordingly, the production cost of target products equipped with MCUs, for example, controllers, is increasing.

For example, when high-specification MCUs for cybersecurity functions are installed in all controllers that are being mass-produced or scheduled for development, the manufacturing cost increases, and as a result, some manufacturers have difficulty applying high-specification MCUs to their controllers, and thus there are cases where cybersecurity-related regulations are not actually complied with.

SUMMARY

Therefore, it is an aspect of the present disclosure to provide a microcontroller unit capable of implementing a cybersecurity function, for example, a tuning protection function, and a security diagnosis method thereof.

Additional aspects of the disclosure will be set forth in part in the description which follows and, in part, will be obvious from the description, or may be learned by practice of the disclosure.

In accordance with one aspect of the present disclosure, a microcontroller unit includes a memory including a memory area for software and configured to store a cyclic redundancy check value for verification, and a processor configured to divide the memory area at a predetermined block size, calculate and accumulate a cyclic redundancy check value for each memory area divided at the predetermined block size until all the memory areas divided at the predetermined block size are referenced, and verify integrity of the software by comparing a result value accumulated by calculating the cyclic redundancy check value with the stored cyclic redundancy check value for verification.

The processor may calculate and accumulate the cyclic redundancy check value for each memory area divided at the predetermined block size during an idle time.

The memory areas divided at the predetermined block size may include a first memory area and a second memory area, the idle time may include a first idle time and a second idle time after the first idle time, and the processor may generate a first result value that is accumulated by calculating the cyclic redundancy check value for the first memory area during the first idle time, and generate a second result value that is accumulated in the first result value by calculating the cyclic redundancy check value for the second memory area during the second idle time.

The processor may generate a task in which the cyclic redundancy check value is calculated and accumulated for each memory area divided at the predetermined block size, and perform the generated task.

The processor may calculate a message authentication code value when the result value matches the cyclic redundancy check value for verification.

The processor may output a message indicating that verification of the integrity of the software has failed when the result value does not match the cyclic redundancy check value for verification.

The processor may verify the integrity of the software through verification of the message authentication code value.

The memory may store a predetermined identification (ID) of the microcontroller unit, and the processor may apply the predetermined identification of the microcontroller unit as a key for calculating and verifying the message authentication code value.

The processor may store the message authentication code value in the memory on the basis of success of the verification of the message authentication code value.

The processor may re-perform calculating and accumulating the cyclic redundancy check value for each memory area divided at the predetermined block size in response to completion of the verification of the message authentication code value.

In accordance with another aspect of the present disclosure, a security diagnosis method of a microcontroller unit includes dividing, by a processor, a memory area for software stored in a memory at a predetermined block size, calculating and accumulating, by the processor, a cyclic redundancy check value for each memory area divided at the predetermined block size until all the memory areas divided at the predetermined block size are referenced, and verifying, by the processor, integrity of the software by comparing a result value accumulated by calculating the cyclic redundancy check value with a cyclic redundancy check value for verification stored in the memory.

The calculating and accumulating of the cyclic redundancy check value for each memory area divided at the predetermined block size may be performed during an idle time of the processor.

The divided memory area may include a first memory area and a second memory area, the idle time may include a first idle time and a second idle time after the first idle time, and the calculating and accumulating of the cyclic redundancy check value for each memory area divided at the predetermined block size may include generating a first result value that is accumulated by calculating the cyclic redundancy check value for the first memory area during the first idle time, and generating a second result value that is accumulated in the first result value by calculating the cyclic redundancy check value for the second memory area during the second idle time.

The calculating and accumulating of the cyclic redundancy check value for each memory area divided at the predetermined block size may include generating a task in which the cyclic redundancy check value is calculated and accumulated for each memory area divided at the predetermined block size, and performing the generated task.

The verifying of the integrity of the software may include calculating a message authentication code value for the result value when the result value matches the stored cyclic redundancy check value for verification.

The security diagnosis method of the microcontroller unit may further include outputting a message indicating that verification of the integrity of the software has failed when the result value does not match the stored cyclic redundancy check value for verification.

The verifying of the integrity of the software may include performing verification on the message authentication code value.

The calculation and verification of the message authentication code value may be performed by applying a predetermined identification of the microcontroller unit as a key for calculating and verifying the message authentication code value.

The security diagnosis method of the microcontroller unit may further include storing the message authentication code value in the memory on the basis of success of the verification of the message authentication code value.

The security diagnosis method of the microcontroller unit may re-perform calculating and accumulating the cyclic redundancy check value for each memory area divided at the predetermined block size in response to completion of the verification of the message authentication code value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
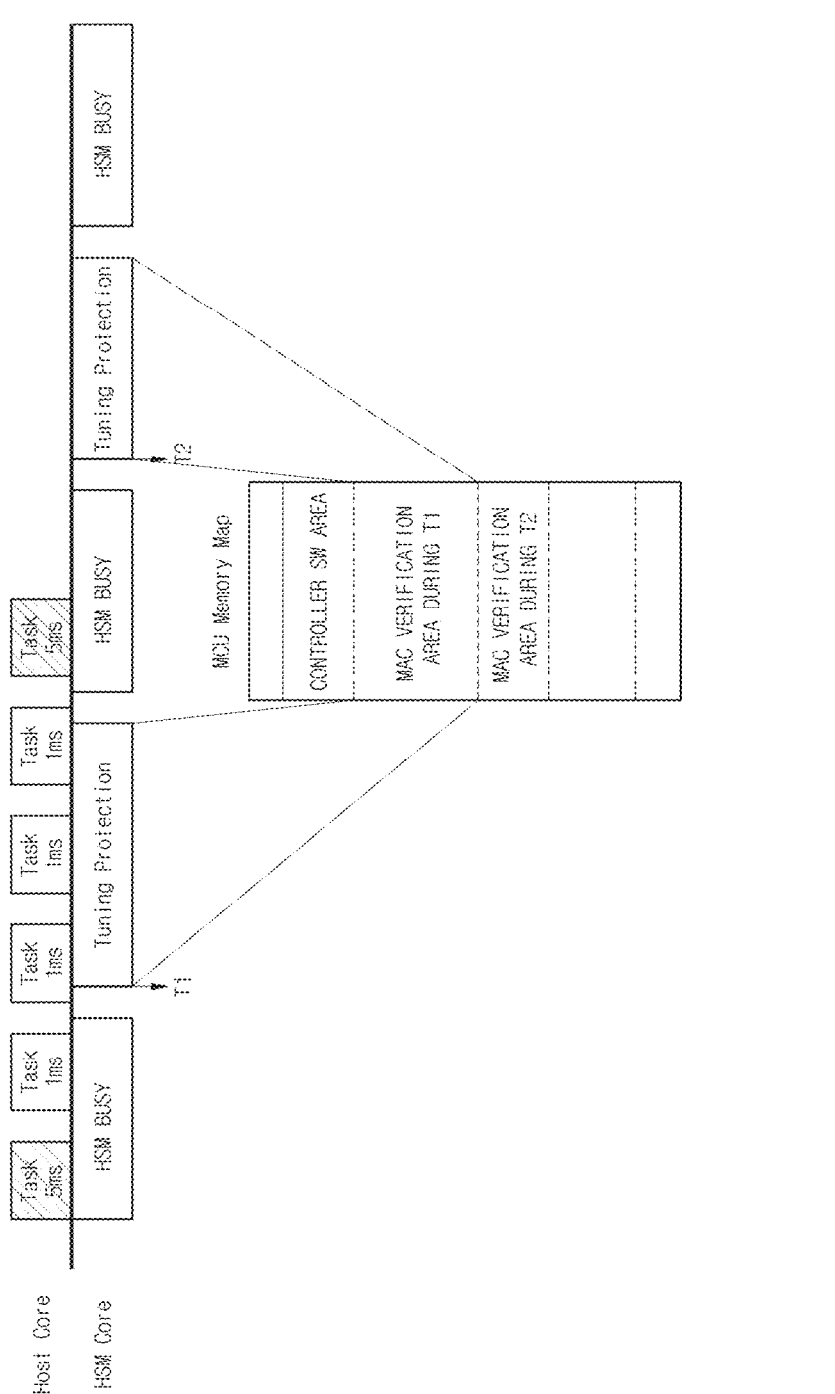
FIG. 1 is a diagram for describing the operation of a conventional tuning protection function.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

A tuning protection function is a cybersecurity function that is periodically executed and repeatedly verifies in real time whether software in a controller has been falsified.

A microcontroller unit (MCU) may have a separate core, for example, a hardware security module (HSM), in addition to a host core, and conventionally, the MCU is implemented so that a general tuning protection function is operated in the HSM.

For example, when the HSM is in an idle time state, the HSM verifies whether a memory area for software of the controller has been falsified. The HSM divides the entire memory area for the software of the controller at a constant block size every cycle and refers to each memory area of the constant block size in calculating a message authentication code (MAC).

The MAC is used to verify whether a message has been falsified, and may be generated through an encryption algorithm, for example, a cipher-based MAC (CMAC) based on the Advanced Encryption Standard 128 (AES-128) encryption algorithm.

The HSM generates and accumulates MAC values obtained by calculating MACs for each memory area of the constant block size, and repeats the generation and accumulation of MAC values until the entire memory area is referenced.

For example, when the tuning protection function is activated, the HSM may generate an MAC value for each memory area of the constant block size, and allow the generated MAC value to be stored in a secure storage within the HSM.

When the generation of the MAC values for the entire memory area is completed, the HSM completes verification of the MAC by comparing whether a pre-stored authentication code value matches the generated MAC value.

Further, when one cycle until verification of the MAC is completed ends, the HSM performs the verification operation again from the beginning.

For example, a key for generating and verifying an MAC is stored in the HSM, and using the key, the above-described MAC value may be generated and the generated MAC value may be verified. Further, a method of storing the key for generating and verifying the MAC may be stored in different ways depending on requirements of a manufacturer (original equipment manufacturer (OEM)), a third party, etc.

FIG. 1 is a diagram for describing the operation of a conventional tuning protection function.

Referring to FIG. 1, conventionally, it can be seen that the tuning protection function is executed in an HSM core, and accordingly, resources of a host core (also referred to as an operation core for software of the controller) are not used.

The HSM core performs tuning protection in an HSM UNBUSY state.

Further, the HSM core generates, that is, calculates, MAC values for a memory of an MCU, for example, some areas of the memory area for the software of the controller included in an MCU memory map.

For example, the HSM core calculates MAC values for the entire memory area for software by calculating MAC values for some areas (MAC verification areas during T1) of the memory area for software during T1 in the HSM UNBUSY state and calculating MAC values for some other areas (MAC verification areas during T2) of the memory area for software during T2 in the HSM UNBUSY state.

When the calculation of the MAC values for the memory area for software is completed, the HSM core may perform MAC verification by comparing the calculated MAC values with a pre-stored MAC value.

Conventionally, the tuning protection function is executed in the HSM core as illustrated in FIG. 1, and thus the resources of the host core are not used to execute the tuning protection function. Further, conventionally, a hardware accelerator supporting an encryption algorithm is installed within an HSM core, which has the effect of shortening time required to verify an MAC. Further, conventionally, a key for generating and verifying an MAC is stored in the HSM core, which can be effective in strengthening security and protecting data integrity.

However, conventionally, as illustrated in FIG. 1, a separate HSM core is provided in the MCU, which has resulted in a problem of increased costs.

When no HSM core is provided in the MCU, the tuning protection function should be executed through the resources of the host core, and thus the execution of the conventional tuning protection function may affect the performance of the MCU.

In order to execute the tuning protection function using the resources of the host core, the encryption algorithm should be implemented in software, which causes a problem of increasing time required for verification. Further, a security problem may occur as the host core should manage the key for generating and verifying the MAC, and there is a problem in that an additional algorithm is required.

In consideration of the above-described matters, the present disclosure allows the tuning protection function to be executed in an MCU not equipped with an HSM core, and the present disclosure is intended to present a method of implementing a new tuning protection function that compensates for the shortcomings in executing the tuning protection function using the resources of the host core described above.

Hereinafter, the operating principle and embodiments of the present disclosure will be described with reference to the accompanying drawings.

Figure 2:
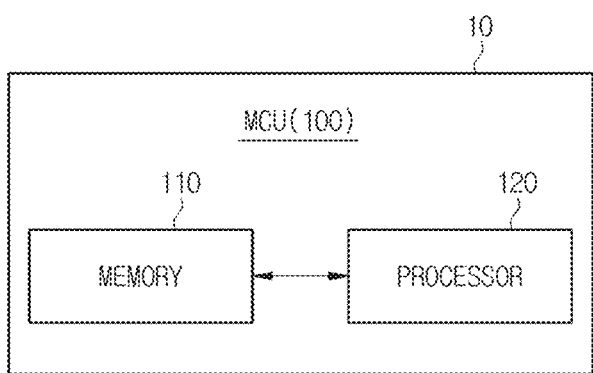
FIG. 2 is a block diagram of a controller according to an embodiment.

FIG. 2 is a block diagram of a controller according to an embodiment.

Referring to FIG. 2, a controller 10 may include an MCU 100, and the MCU 100 may include a memory 110 and a processor 120.

For example, the controller 10 may be implemented as a controller for any one of various devices such as a vehicle, a driver assistance system of the vehicle, a brake system of the vehicle, and/or various electronic devices (e.g., a smartphone, a tablet personal computer (PC), etc.)

The memory 110 may store various types of programs (also referred to as software programs) and data necessary for the operation of the controller 10.

The memory 110 may temporarily store each piece of data and a processing result of each piece of data of the processor 120.

The memory 110 may be implemented as a non-volatile memory (e.g., a flash memory, a read-only memory (ROM), an erasable programmable ROM (EPROM), etc.), a volatile memory (e.g., a static random access memory (SRAM), a dynamic random access memory (DRAM), etc.), a hard disk drive (HDD), etc.

The memory 110 may include a memory area for software.

The memory 110 may be accessed by the processor 120, and data may be retrieved, recorded, modified, deleted, and/or updated by the processor 120.

The processor 120 may control the operation of the controller 10.

The processor 120 may be a core on which software operates, for example, a host core, and may execute a tuning protection function to verify the integrity of the software.

For example, the tuning protection function may include a cyclic redundancy check (CRC) for the memory area for the software and an MAC check for a result value of the CRC.

For example, the processor 120 may be implemented so that a tuning protection operation is performed only for a short period of time every cycle.

Figure 3:
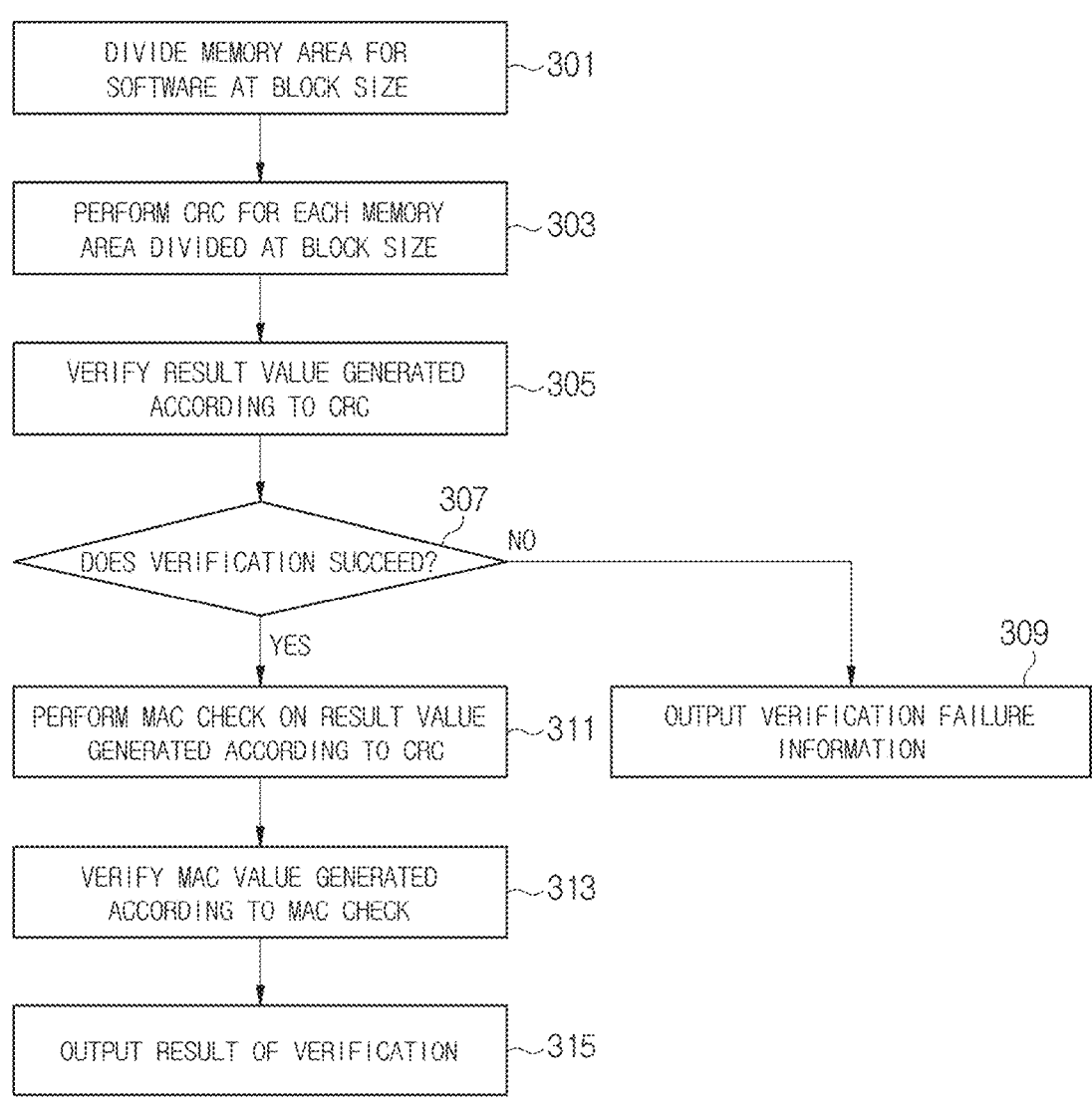
FIG. 3 is a flowchart of a tuning protection operation of a processor of a microcontroller unit according to an embodiment.

FIG. 3 is a flowchart of a tuning protection operation of a processor 120 of an MCU 100 according to an embodiment.

Figure 4:
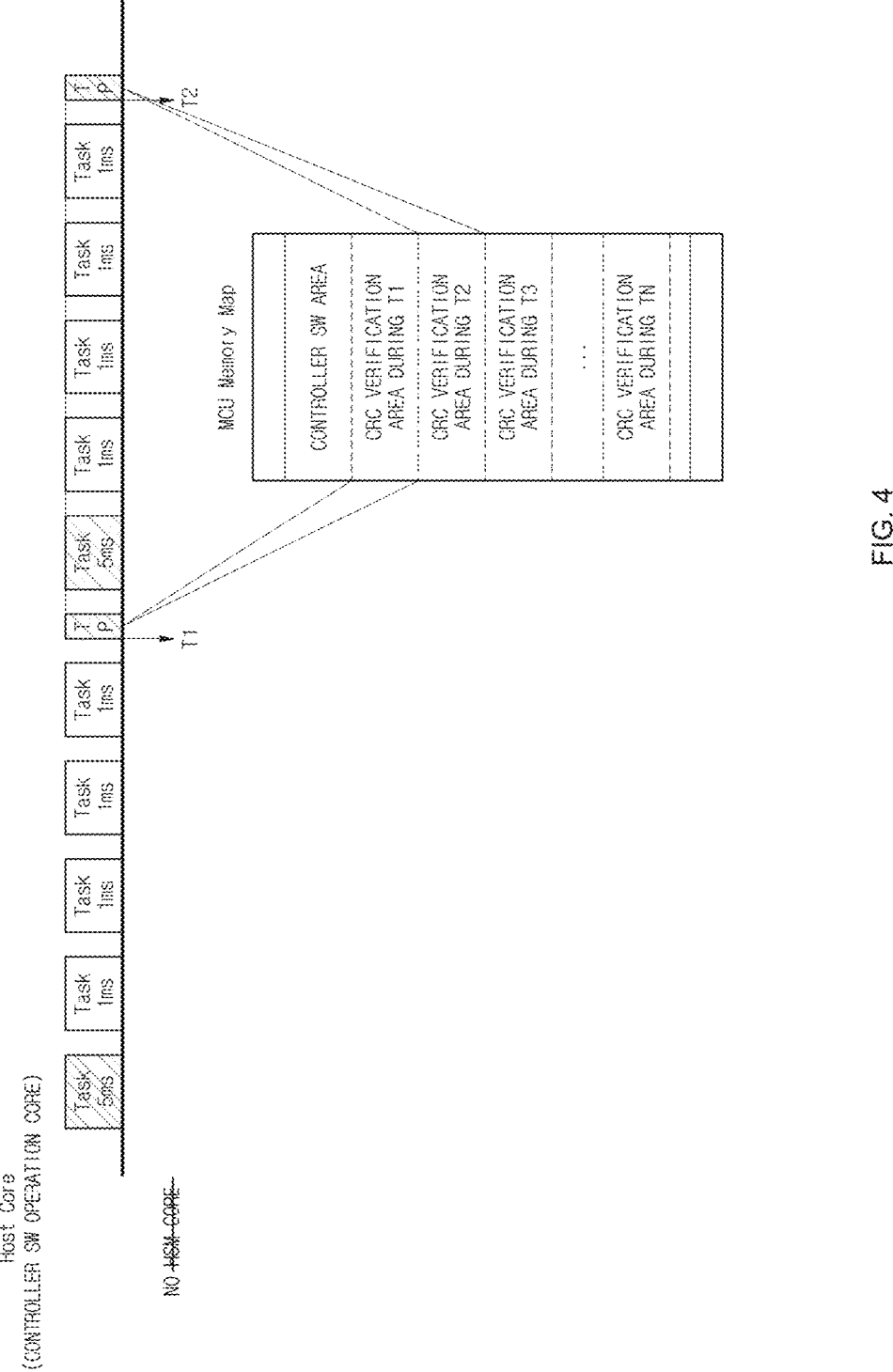
FIG. 4 is a diagram for describing a tuning protection operation of a processor of a microcontroller unit according to an embodiment.

FIG. 4 is a diagram for describing the tuning protection operation of the processor of the MCU 100 according to the embodiment.

Referring to FIG. 3, the processor 120 may divide a memory area for software at a predetermined block size (301).

The processor 120 may divide the entire memory area for the software at a predetermined block size every cycle.

For example, by pre-specifying the block size as a minimum size, a processing time of the processor 120 for CRC, that is, calculation and accumulation of CRC values, for each memory area for the software divided at the predetermined block size, which will be described below, may be shortened.

The processor 120 may perform the CRC for each memory area divided at the predetermined block size (303).

The processor 120 may calculate and accumulate the CRC values for each memory area by referring each memory area divided at the predetermined block size to the CRC. For example, the processor 120 may repeat the calculation and accumulation of the CRC values until the entire memory area for the software is referenced.

Referring to FIG. 4, the memory area for the software (controller SW area) may be allocated to the memory 110, for example, a memory map of the MCU (MCU memory map), and the processor 120 may divide the memory area (controller SW area) into n memory areas (n is an integer).

The processor 120 may calculate and accumulate CRC values for each of the memory areas divided at a predetermined block size at T1 and T2, which correspond to idle times while main tasks are performed, thereby allowing the CRC to be performed for a short period of time every cycle.

For example, CRC values for a first software memory area (or CRC verification area) divided at a predetermined block size may be calculated during T1 after each task is performed. Thereafter, CRC values for a second software memory area (also called a CRC verification area) divided at a predetermined block size may be calculated during T2 after each task is performed, and the CRC values for the entire memory area for the software may be calculated and accumulated by accumulating the CRC values calculated during T1. For example, the CRC values for the corresponding area may be calculated and accumulated during a period of time from T1 to Tn.

Since the calculation of the CRC values is a conventionally known technique, detailed descriptions thereof will be omitted.

The processor 120 may verify a result value generated according to the CRC (305).

The processor 120 may verify the generated result value by comparing a result value generated upon completion of calculation and accumulation of the CRC values for the entire memory area for the software with a pre-stored CRC value for verification. For example, the processor 120 may verify whether the generated result value matches the pre-stored CRC value for verification.

The processor 120 may determine whether the verification of the result value generated according to the CRC succeeds (307).

When the generated CRC value matches a pre-stored reference CRC value, the processor 120 may determine that the verification of the CRC value succeeds.

When the generated CRC value does not match the pre-stored reference CRC value, the processor 120 may determine that the verification of the CRC value has failed, that is, determine that the integrity of the software has been damaged (e.g., data loss and/or security problems in the software have occurred, etc.).

The processor 120 may perform operation 311 when the verification of the CRC values succeeds, and otherwise, perform operation 309.

The processor 120 may output verification failure information indicating that the verification of the CRC value has failed (309).

The processor 120 may perform an MAC check on the result value generated according to the CRC (311).

The processor 120 may apply a unique ID of the MCU 100 as a key for generating and verifying an MAC to check the MAC, that is, calculate an MAC value for the result value generated according to the CRC.

For example, the unique ID of the MCU 100 is provided by a manufacturer of the MCU 100 and may be pre-stored in the memory 110.

Since calculating an MAC value using a secret key is a method according to the related art, a detailed description of calculating an MAC value for a CRC value will be omitted.

The processor 120 may verify an MAC value generated according to the MAC check (313).

The processor 120 may verify the MAC value for the CRC value by comparing the MAC value for the CRC value with the MAC value for verification.

For example, the processor 120 may generate the MAC value for verification using the unique ID of the MCU 100 and pre-store the generated MAC value for verification.

For example, the processor 120 may verify whether the MAC value for the CRC value matches the pre-stored MAC value for verification.

The processor 120 may output a result of the verification of the MAC value (315).

When the MAC value for the CRC value matches the pre-stored MAC value for verification, the processor 120 may output information indicating that the integrity of the software has been verified.

When the MAC value for the CRC value is different from the pre-stored MAC value for verification, the processor 120 may output information indicating that the integrity of the software has been damaged.

Meanwhile, when one cycle according to the operation of the above-described embodiment of FIG. 3 is completed, for example, when operation 309 or 315 is completed, the processor 120 may perform the operation again from operation 301.

Further, in response to operation 313, the processor 120 may flash the MAC value generated according to operation 311 in an area for the controller, for example, store the generated MAC value in the memory 110.

The idle times during the execution of the tasks in the above-described embodiment may be very short times as shown in FIG. 4, but the reason tuning protection can be implemented in such a short period of time is because verification is performed through the CRC rather than the MAC check.

Further, the calculation and verification of the MAC value for the CRC value as in the above-described embodiment has an advantage that time required for encryption and decryption is not long because the CRC value is a maximum of 4 bytes.

The calculation of the MAC value in the above-described embodiment differs from the related art in that the calculation is performed on the CRC value rather than on each divided memory area for the software.

Generally, in consideration of the fact that the CRC has vulnerability that lowers the security strength compared to the MAC check, in the above-described embodiment, the lowered security strength due to the CRC was compensated for by calculating the MAC value for the result value generated through the CRC.

Further, the calculation of the MAC value in the above-described embodiment differs from in the related art in that the unique ID of the MCU 100 is applied as a key for generating and verifying an MAC.

As in the above-described embodiment, when the unique ID of the MCU 100 is applied as the key for generating and verifying the MAC, there is no need for a sequence for generating and storing the key for generating and verifying the MAC, and thus there is an effect that the tuning protection can be easily implemented. Further, since the unique ID of the MCU 100 is different for each controller 10, it is possible to provide an advantage in terms of security, that is, increase the security strength.

Further, the above-described embodiment can provide the effect of satisfying the function and performance of tuning protection even in a short period of time.

The above-described embodiments can provide a technology for implementing a tuning protection function from which dependency on the conventional HSM is eliminated.

For example, in the above-described embodiments, it can be said that the encryption algorithm applied to the tampering verification has been changed from an algorithm for implementing a conventional MAC to one that combines an algorithm for implementing a CRC and an algorithm for implementing an MAC.

Generally, since low-cost MCUs do not have a separate HSM, the resources of the processor are limited. Further, the processor spends a long time on encryption and/or decryption algorithms because there is no hardware encryption accelerator provided by the HSM.

In order to overcome these shortcomings, in the above-described embodiments, the effectiveness of the entire memory area for the software of the controller was verified through the CRC that takes less time than the MAC check.

Further, since verification of the CRC alone does not increase the security strength, in the above-described embodiments, the security strength can be improved by performing verification of the MAC check for the result value according to the CRC.

In the above-described embodiments, the key for generating and verifying the MAC value can be implemented using only the resources of the MCU 100 without a need for a separate process of generating and storing the key for generating and verifying the MAC value.

Generally, a secret key for encryption and/or decryption is required to generate and verify the MAC value. Since such a secret key should not be exposed, a separate method of exchanging the key is required to safely store the secret key. However, advanced encryption and/or decryption logic may be a luxury for low-cost MCUs.

For this reason, in the above-described embodiment, the unique ID of the MCU provided by the manufacturer of the MCU was applied without a need to separately inject the key for generating and verifying the MAC value from the outside. The unique ID of the MCU is unique information for each MCU.

In the above-described embodiment, even when the result value of the CRC is the same for each controller, the MCU may have different MAC values through the ID.

Accordingly, even when tuning protection is bypassed by one controller, the tuning protection cannot be bypassed through the same software on another controller.

Therefore, the security strength can be increased from the perspective of the entire manufactured controller.

As is apparent from the above description, in the MCU and the security diagnosis method thereof according to the above-described embodiments, a tuning protection function can also be applied to controllers equipped with a low-cost MCU to meet cybersecurity requirements and prepare for cybersecurity threats.

Further, in the MCU and the security diagnosis method thereof according to the above-described embodiments, a low-cost MCU alone is enough to meet cybersecurity requirements, and thus the production cost of controllers can be reduced.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A microcontroller unit comprising:
a memory including a memory area for software and configured to store a cyclic redundancy check value for verification of integrity of the software; and
a processor configured to divide the memory area of the memory into a plurality of divided memory areas at a block size, calculate and accumulate each of cyclic redundancy check values for each of the plurality of divided memory areas divided at the block size, and verify the integrity of the software by comparing an accumulated value of the cyclic redundancy check values for the plurality of divided memory areas with the cyclic redundancy check value for the verification stored in the memory,
wherein:
the processor is configured to calculate and accumulate each of the cyclic redundancy check values for each of the plurality of divided memory areas divided at the block size during one or more idle times of the processor,
the plurality of divided memory areas divided at the block size include a first memory area and a second memory area,
the one or more idle times include a first idle time and a second idle time after the first idle time, and
the processor is configured to calculate a first accumulated value of first cyclic redundancy check values for the first memory area during the first idle time, and calculate a second accumulated value of second cyclic redundancy check values for the second memory area during the second idle time.

2. The microcontroller unit of claim 1, wherein the processor is configured to generate a task in which each of the cyclic redundancy check values for each of the plurality of divided memory areas divided at the block size is calculated and accumulated, and perform the generated task.

3. The microcontroller unit of claim 1, wherein the processor is configured to calculate a message authentication code value for the accumulated value of the cyclic redundancy check values for the plurality of divided memory area when the accumulated value of the cyclic redundancy check values for the plurality of divided memory areas matches the cyclic redundancy check value for the verification stored in the memory.

4. The microcontroller unit of claim 3, wherein the processor is configured to verify the integrity of the software through verification of the message authentication code value for the accumulated value of the cyclic redundancy check values for the plurality of divided memory area.

5. The microcontroller unit of claim 4, wherein:
the memory is configured to store a predetermined identification of the microcontroller unit; and the processor is configured to apply the predetermined identification of the microcontroller unit as a key for calculating and verifying the message authentication code value.

6. The microcontroller unit of claim 4, wherein the processor is configured to store the message authentication code value in the memory in response to success of the verification of the message authentication code value.

7. The microcontroller unit of claim 4, wherein the processor is configured to re-perform calculation and accumulation of each of the cyclic redundancy check values for each of the plurality of divided memory areas divided at the block size in response to completion of the verification of the message authentication code value.

8. The microcontroller unit of claim 1, wherein the processor is configured to output a message indicating that the verification of the integrity of the software has failed when the accumulated value of the cyclic redundancy check values for the plurality of divided memory areas does not match the cyclic redundancy check value for the verification stored in the memory.

9. A security diagnosis method of a microcontroller unit, comprising:
    dividing, by a processor, a memory area for software stored in a memory into a plurality of divided memory areas at a block size, wherein the memory stores a cyclic redundancy check value for verification of integrity of the software;
    calculating and accumulating, by the processor, each of cyclic redundancy check values for each of the plurality of divided memory areas divided at the block size; and
    verifying, by the processor, the integrity of the software by comparing an accumulated value of the cyclic redundancy check values for the plurality of divided memory area with the cyclic redundancy check value for the verification stored in the memory,
    wherein:
    the calculating and accumulating of each of the cyclic redundancy check values for each of the plurality of divided memory areas divided at the block size are performed during one or more idle times of the processor,
    the plurality of divided memory areas include a first memory area and a second memory area,
    the one or more idle times include a first idle time and a second idle time after the first idle time, and
    the calculating and accumulating of each of the cyclic redundancy check values for each of the plurality of divided memory areas divided at the block size includes calculate a first accumulated value of first cyclic redundancy check values for the first memory area during the first idle time, and calculating a second accumulated value of second cyclic redundancy check values for the second memory area during the second idle time.

10. The security diagnosis method of claim 9, wherein the calculating and accumulating of each of the cyclic redundancy check values for each of the plurality of divided memory areas divided at the block size include generating a task in which each of the cyclic redundancy check values for each of the plurality of divided memory areas divided at the block size is calculated and accumulated, and performing the generated task.

11. The security diagnosis method of claim 9, wherein the verifying of the integrity of the software includes calculating a message authentication code value for the accumulated value of the cyclic redundancy check values for the plurality of divided memory area when the accumulated value of the cyclic redundancy check values for the plurality of divided memory area matches the cyclic redundancy check value for the verification stored in the memory.

12. The security diagnosis method of claim 11, wherein the verifying of the integrity of the software includes performing verification on the message authentication code value for the accumulated value of the cyclic redundancy check values for the plurality of divided memory area.

13. The security diagnosis method of claim 12, wherein the calculating of the message authentication code value and the performing of the verification on the message authentication code value are performed by applying a predetermined identification of the microcontroller unit as a key for calculating and verifying the message authentication code value.

14. The security diagnosis method of claim 12, further comprising storing the message authentication code value in the memory in response to success of the verification of the message authentication code value.

15. The security diagnosis method of claim 12, further comprising, in response to completion of the verification of the message authentication code value, re-performing the calculating and accumulating of each of the cyclic redundancy check values for each of the plurality of divided memory areas divided at the block size.

16. The security diagnosis method of claim 9, further comprising outputting a message indicating that the verification of the integrity of the software has failed when the accumulated value of the cyclic redundancy check values for the plurality of divided memory area does not match the cyclic redundancy check value for the verification stored in the memory.

* * * * *